United States Patent
Yi et al.

(10) Patent No.: US 8,559,910 B2
(45) Date of Patent: Oct. 15, 2013

(54) OTA INITIATION METHOD FOR TELEMATICS SYSTEM IN 2G GSM/3G WCDMA NETWORK

(75) Inventors: Ki Hak Yi, East Windsor (CA); Sethu K. Madhavan, Erie, PA (US); Lawrence D. Cepuran, Northville, MI (US); David A. Holt, Rochester Hills, MI (US)

(73) Assignee: General Motors LLC., Detroit, MI (US)

( * ) Notice: Subject to any disclaimer, the term of this patent is extended or adjusted under 35 U.S.C. 154(b) by 126 days.

(21) Appl. No.: 13/080,236

(22) Filed: Apr. 5, 2011

(65) Prior Publication Data

US 2012/0258725 A1 Oct. 11, 2012

(51) Int. Cl.

| | |
|---|---|
| H04M 11/04 | (2006.01) |
| H04M 1/66 | (2006.01) |
| H04M 1/68 | (2006.01) |
| H04M 3/16 | (2006.01) |
| H04M 3/42 | (2006.01) |
| H04W 24/00 | (2009.01) |
| H04W 4/00 | (2009.01) |
| H04W 76/00 | (2009.01) |
| H04W 4/22 | (2009.01) |

(52) U.S. Cl.
CPC .............. *H04W 76/007* (2013.01); *H04W 4/22* (2013.01); *H04M 11/04* (2013.01)
USPC ..................... 455/404.1; 455/411; 455/414.1; 455/417; 455/432.1; 455/433

(58) Field of Classification Search
USPC ................ 455/404.1, 414.1, 417, 432, 432.1, 455/432.2, 433, 445, 456.1, 456.3, 411, 455/435; 370/329, 338; 379/201.4; 342/457
See application file for complete search history.

(56) References Cited

U.S. PATENT DOCUMENTS

| | | | | |
|---|---|---|---|---|
| 5,924,035 | A | * | 7/1999 | Joensuu .......................... 455/445 |
| 5,943,621 | A | * | 8/1999 | Ho et al. ..................... 455/456.3 |
| 5,978,673 | A | * | 11/1999 | Alperovich et al. .......... 455/417 |
| 6,038,445 | A | * | 3/2000 | Alperovich et al. ....... 455/432.1 |
| 6,269,244 | B1 | * | 7/2001 | Alperovich et al. .......... 455/433 |
| 6,681,111 | B2 | * | 1/2004 | Ahn et al. .................. 455/432.2 |

(Continued)

OTHER PUBLICATIONS

*3GPP Organizational Partners Technical Specification* entitled: "3rd Generation Partnership Project: Technical Specification Group Core Network and Terminals: Location Management Procedures", (Release 10), 3GPP TS 23.012 V10.0 (Mar. 2011) (54 Pages Total).

(Continued)

*Primary Examiner* — William D Cumming
(74) *Attorney, Agent, or Firm* — Leydig, Voit & Mayer, Ltd.

(57) ABSTRACT

The described method and system provide for over-the-air configuration of a telematics-equipped vehicle by wireless carriers and telematics service providers (TSPs). Regardless of whether a telematics-equipped vehicle has been provisioned for cellular service or not, the TSP and wireless carrier may control undesirable location updating from the vehicle, for example, by setting certain triggers or conditions upon the telematics unit before processing location updates provided by the telematics unit. These triggers or conditions may also be programmed into the telematics unit, whether through an OTA configuration session, or pre-loaded during manufacture. The TSP or wireless carrier may conduct OTA configuration sessions with the telematics unit to provision the telematics unit for cellular service, or provide the telematics unit with software or firmware updates.

15 Claims, 4 Drawing Sheets

(56) References Cited

U.S. PATENT DOCUMENTS

| | | | |
|---|---|---|---|
| 7,426,203 B1* | 9/2008 | McNamara et al. | 370/338 |
| 7,444,133 B1* | 10/2008 | McNamara et al. | 455/411 |
| 7,444,137 B1* | 10/2008 | McNamara et al. | 455/414.1 |
| 7,565,131 B2* | 7/2009 | Rollender | 455/404.1 |
| 7,738,421 B2* | 6/2010 | McNamara et al. | 370/329 |
| 7,764,231 B1* | 7/2010 | Karr et al. | 342/457 |
| 7,965,682 B2* | 6/2011 | McNamara et al. | 370/329 |
| 2002/0061745 A1* | 5/2002 | Ahn et al. | 455/432 |
| 2003/0027581 A1 | 2/2003 | Jokinen et al. | |
| 2003/0129980 A1* | 7/2003 | Sayeedi | 455/435 |
| 2006/0129638 A1 | 6/2006 | Deakin | |
| 2006/0205383 A1* | 9/2006 | Rollender | 455/404.1 |
| 2009/0285377 A1* | 11/2009 | Sennett et al. | 379/201.04 |
| 2011/0039533 A1 | 2/2011 | Yi et al. | |
| 2012/0258725 A1* | 10/2012 | Yi et al. | 455/456.1 |

OTHER PUBLICATIONS

*3GPP Organizational Partners Technical Specification* entitled: "*3rd Generation Partnership Project: Technical Specification Group Core Network and Terminals; Non-Access-Stratum (NAS) Functions Related to Mobile Station (MS) in Idle Mode*", (Release 10), 3GPP TS 23 122 V10.30 (Mar. 2001) (43 Pages Total).

* cited by examiner

OTA INITIATION METHOD FOR TELEMATICS SYSTEM IN 2G GSM/3G WCDMA NETWORK

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Telematics units are conventionally pre-loaded with cellular service information, such as an MSISDN (Mobile Subscriber Integrated Services Digital Network Number), IMSI (International Mobile Subscriber Identity), or other carrier information. However, pre-loading telematics units with cellular service information is disadvantageous as it requires the manufacturer of the telematics unit (which may or may not be the same manufacturer as the manufacturer of the vehicle) to work with a wireless carrier and manage the programming of phone numbers and other information into the telematics unit. Additionally, this may result in unnecessary network traffic for a cellular carrier as telematics-equipped vehicles may attempt to register with the cellular network before a SIM (Subscriber Identity Module) profile is programmed into an HLR (Home Location Register) of the cellular network.

Thus, it is an object in part to provide a system and method for controlling the network-related operations of telematics-equipped vehicles to reduce unnecessary consumption of network resources. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for providing over-the-air configuration functionality to a telematics-equipped vehicle by wireless carriers and TSPs. The telematics unit of a telematics-equipped vehicle may send location updates over a network to an MSC (mobile switching center) on the network (which may be a 2G GSM/3G WCDMA network), and the MSC may hold the location updates or process them depending on whether a predetermined condition or trigger has occurred. In one implementation, location updates sent from a telematics unit may be held until the MSC determines that cellular service information (such as a SIM, MSISDN, IMSI, or Local Access Number) has been programmed into an HLR on the network. The predetermined condition may also be that the TSP determines or indicates that the telematics unit is ready to be provisioned with cellular service information.

After the condition is determined to have been met by the MSC, the wireless carrier may initiate an OTA configuration session with the telematics unit in order to provision the telematics unit with cellular service information or provide it with software or firmware updates. The wireless carrier may further determine whether the OTA configuration session was complete.

In another implementation of the described principles, control over the sending of location updates and OTA configuration may be implemented on the telematics unit, such as through commands or instructions sent from the TSP to the telematics unit. The TSP may instruct the telematics unit not to send location updates until the occurrence of certain conditions or triggers, such as an amount of time elapsing, receiving an input indicating that location updates should be sent, and detection of an emergency situation. After the condition has occurred, the TSP may initiate an OTA configuration session with the telematics unit over a network to provision the telematics unit with cellular service information or provide the telematics unit with software or firmware updates. The TSP may further determine whether the OTA configuration session was completed.

In yet another implementation of the described principles, the processes described herein may be stored as instructions on a tangible, non-transient computer-readable medium at the telematics unit, including, for example, instructions for controlling the sending of location updates and conducting OTA configuration sessions.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for providing over-the-air configuration to a telematics-equipped vehicle by wireless carriers and TSPs. With respect to telematics-equipped vehicles that are not pre-loaded with cellular information, the TSP may initialize an OTA configuration session with a vehicle such that it is provisioned for cellular service, and the TSP may further provide the cellular service information provisioned to the vehicle to a wireless carrier for storage on the wireless carrier's network (e.g. at an HLR).

Regardless of whether a telematics-equipped vehicle has been provisioned for cellular service or not, the TSP and wireless carrier may control undesirable location updating from the vehicle, for example, by setting certain triggers or conditions upon the telematics unit before processing location updates provided by the telematics unit. These triggers or conditions may also be programmed into the telematics unit, whether through an OTA configuration session, or pre-loaded during manufacture. The telematics unit sends location updates in order to "register" with, or "attach" to, an MSC corresponding to the location of the telematics unit.

In some implementations, the OTA configuration session may relate to setting up the telematics unit for cellular service, and may involve the wireless carrier or TSP sending and receiving information to and from the telematics unit such that a user may utilize the telematics unit for telematics services over the network. In other implementations, the OTA configuration session may relate to updating software or firmware on the telematics unit, and the user of the telematics unit may further be given the option of declining non-critical updates.

Figure 1:
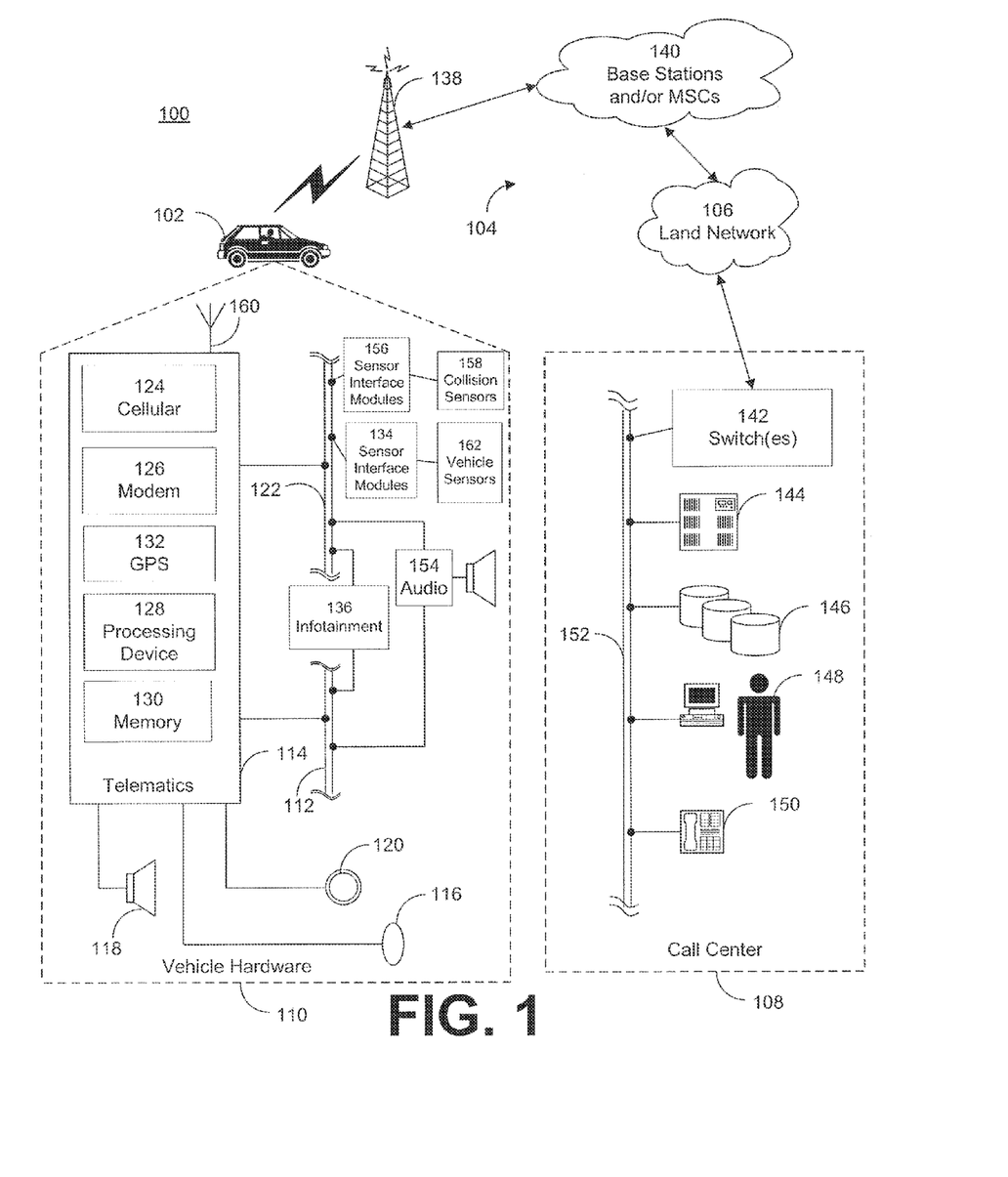
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
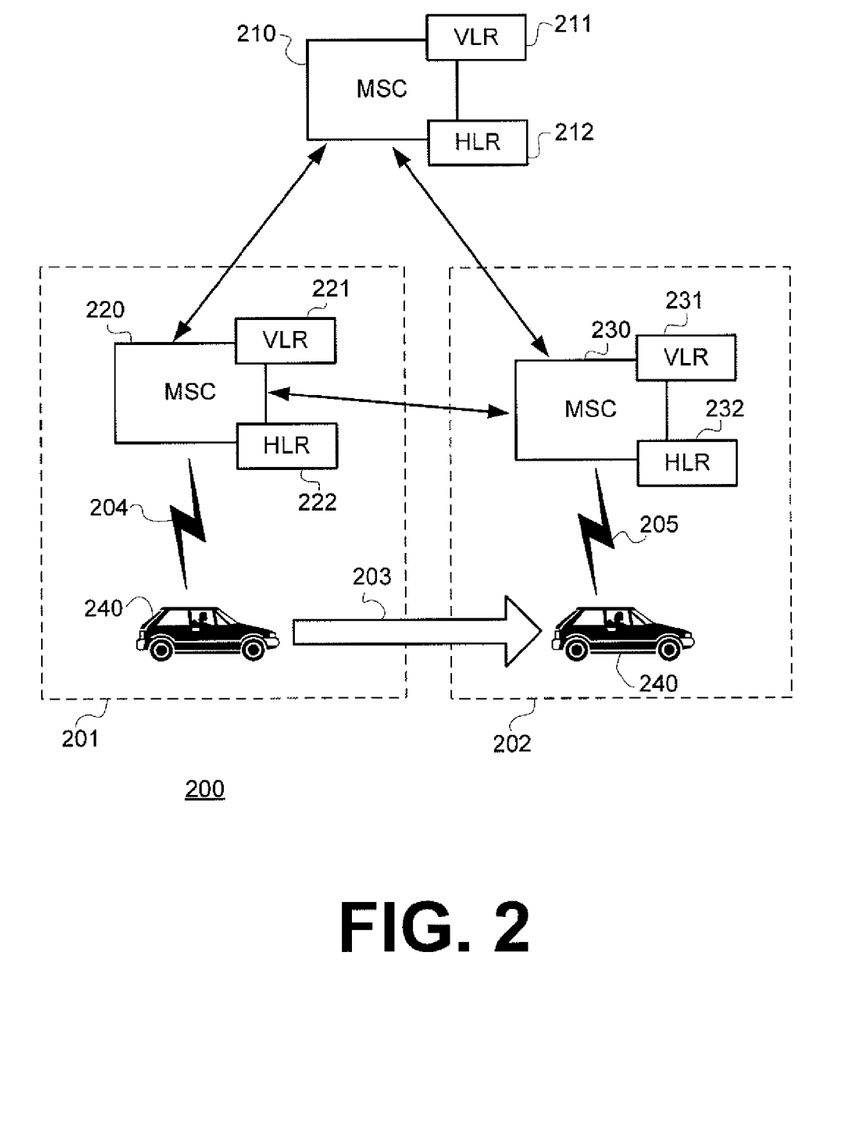
FIG. 2 is a diagram illustrating conventional communications between a vehicle and mobile switching centers in a cellular network in accordance with the operating environment depicted by FIG. 1.

With further reference to the architecture of FIG. 1, and turning more specifically to FIG. 2, a diagram 200 is depicted showing an example of location updating performed by a telematics-equipped vehicle 240. In one implementation, the wireless network is a 2G GSM/3G WCDMA (2G Global System for Mobile Communications/3G Wideband Code Division Multiple Access) network, and the telematics unit of vehicle 240 has already been provisioned with cellular service information. The IMSI or SIM information and the MSISDN or Local Access Number associated with the vehicle are stored at an HLR 212 connected to a first MSC 210 to which the vehicle is assigned. A VLR (Visitor Location Register) 211 is also connected to the first MSC 210.

When the vehicle 240 enters the region 201 serviced by a second MSC 220, the vehicle 240 updates its location 204 with the VLR (Visitor Location Register) 221 connected to the second MSC 220, and the second MSC 220 updates the HLR 212 at the first MSC 210 of the new vehicle location. Similarly, when the vehicle 240 travels 203 to the region 202 serviced by a third MSC 230, the vehicle 240 updates 205 the VLR 231 connected to the third MSC 230, which may further update the first two MSCs 210, 220 regarding the vehicle's new location.

In another implementation, the vehicle telematics unit may not be provisioned with cellular service information yet, and the vehicle 240 may send location updates based on an equipment identifier—such as a mobile equipment identifier (MEID), electronic serial number (ESN), international mobile equipment identifier (IMEI), integrated circuit card identifier (ICCID), or other types of equipment identifiers—and a common MIN (Mobile ID Number), MDN (Mobile Directory Number), Local Area Number, MSISDN, or IMSI associated with inactive or deactivated telematics units.

It may be undesirable to process location updates from telematics units that have not been provisioned with cellular service information until the telematics unit is to be provisioned. For example, if a consumer purchases a telematics-equipped vehicle and does not purchase a subscription requiring cellular service right away, all the location updates sent by the purchased vehicle are unnecessary, as the TSP and the wireless carrier do not need to know the location of the vehicle until it the TSP or wireless carrier needs to provision the vehicle (e.g. when the customer purchases certain TSP services).

These unnecessary location updates waste network resources, and can be avoided by implementing control over location update processing at the MSC by holding undesired location update messages from vehicles that have not yet been provisioned. Alternatively, the telematics unit of the vehicle may also be programmed such that it only begins sending out location updates when necessary (e.g. when it receives an input that indicates it is going to be provisioned).

It will be appreciated that the TSP and wireless carrier may control how and when to hold location updating throughout the lifecycle of a SIM subscription, whether through the MSCs or through the telematics unit, and that it may be controlled in a variety of ways. For example, the TSP send a command to a telematics unit to instruct the telematics unit not to send location updates for a set period of time (e.g. a certain amount of time elapses), or upon the occurrence of another trigger or condition (e.g. detection of an emergency event such as an accident or theft, or receiving an input instructing it to resume sending location updates).

Figure 3:
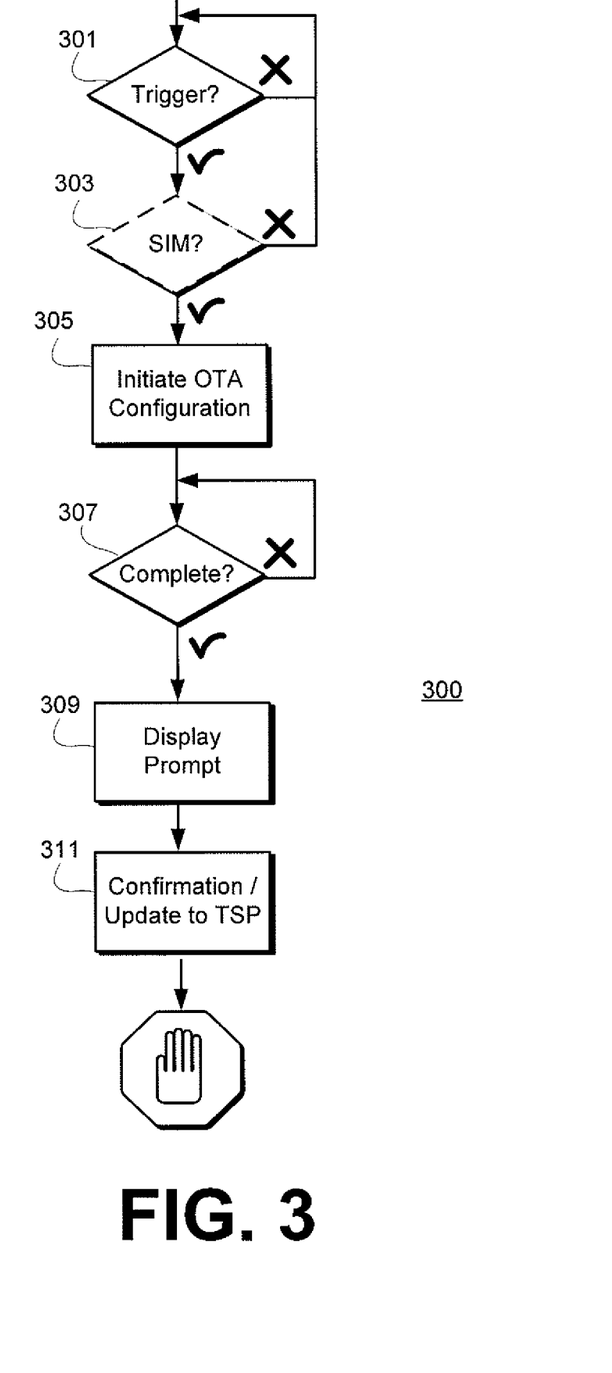
FIG. 3 is a flowchart illustrating a process for OTA configuration in accordance with an implementation of the described principles.

With further reference to the architecture of FIGS. 1 and 2, and turning more specifically to FIG. 3, a process 300 is depicted illustrating a process for initiating OTA configuration for a telematics-equipped vehicle in order to provision it with cellular service information. The processing of location updates may first depend on initial flag setting by the wireless carrier or the TSP at MSCs or telematics units. For example, a flag value may be set to "false" until the occurrence of a predetermined trigger 301, and until that trigger 301 occurs, no location update processing for a particular vehicle will occur.

The trigger may be, for example, the TSP informing the wireless carrier that the particular vehicle is ready to be provisioned, or may be the assignment of certain cellular information to the vehicle (such as an IMSI or SIM and MSISDN or Local Access Number). In one implementation, even if a trigger occurs, a location update may not be processed until a profile corresponding to the vehicle is programmed into an HLR on the wireless carrier network (e.g. a SIM profile). If the wireless carrier or TSP determines through the telematics unit or MSCs that a SIM profile is not present in the HLR 303, the wireless carrier or TSP may prohibit location updating and may prohibit OTA configuration from being initiated. After the wireless carrier or TSP determines that the SIM profile has been programmed into the HLR 303, then location updating and initiation of OTA configuration may be allowed to proceed.

After the occurrence of a trigger, the TSP or the wireless carrier may initiate OTA configuration (i.e. an over-the-air programming session) 305 to provision the vehicle with cellular service information and configure the telematics unit to allow a user to access TSP services over the cellular network. It will be appreciated that initiating OTA configuration may involve processing a location update to determine the location of the vehicle on the network. Then, the TSP or the wireless carrier, or both, may send provisioning information to the vehicle and check 307 whether the vehicle has been successfully provisioned.

For example, in one implementation, the TSP or the wireless carrier may send a test command to the telematics unit commanding it to perform a location update to check whether it has been configured properly. If provisioning was not completed successfully 307, the TSP or wireless carrier may continue attempting to complete it. Upon determination that the provisioning is complete 307, the telematics unit may display or play a prompt 309 to the user indicating completion of the OTA, and may further indicate the MSISDN or Local Access Number assigned to the telematics unit.

In a further implementation, if the TSP specified the cellular service information to be assigned to the telematics unit, the telematics unit or the wireless carrier (or both) may further send a confirmation to the TSP of the cellular service information actually assigned to the telematics unit, which may include the MSISDN or Local Access Number 311. In yet another further implementation, if the wireless carrier specified the cellular service information to be assigned to the telematics unit, the telematics unit or the wireless carrier (or both) may further send an update to the TSP which informs the TSP of the cellular service information that was assigned to the telematics unit 311. Furthermore, after the TSP has received a confirmation or update from the telematics unit or wireless carrier (or both), the TSP may attempt to connect with the telematics unit utilizing the cellular service information provided to the TSP to ensure that the telematics unit has been provisioned properly. It will be appreciated that the telematics unit may be provisioned at any location on the network regardless of which MSC's HLR the telematics unit's IMSI and MSISDN are assigned to.

Figure 4:
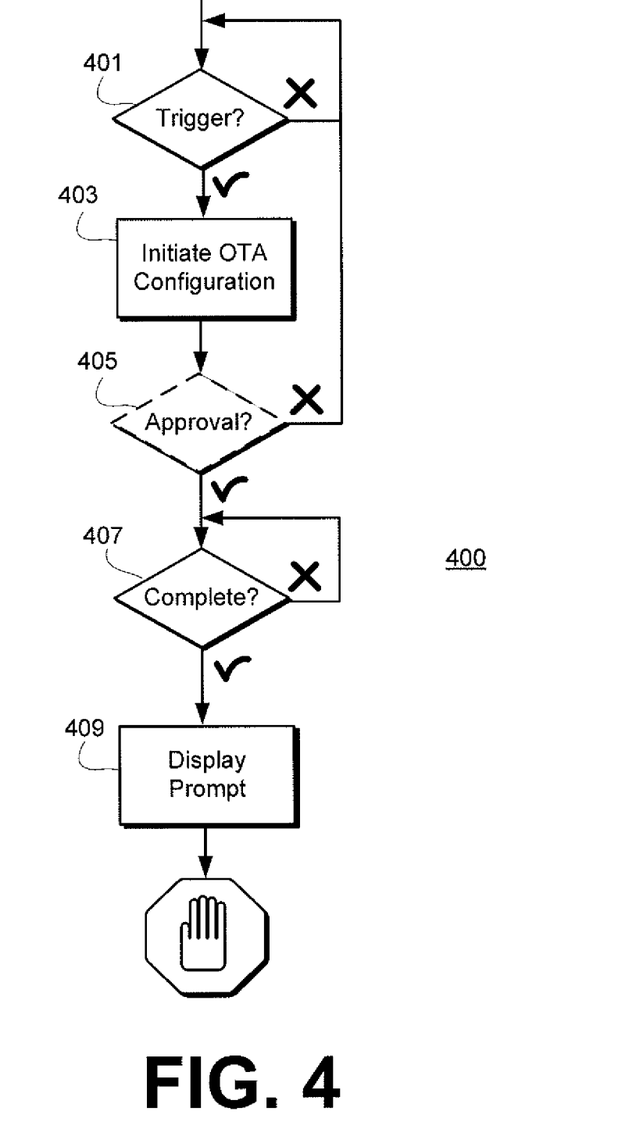
FIG. 4 is a flowchart illustrating another process for OTA configuration in accordance with an implementation of the described principles.

With further reference to the architecture of FIG. 1 and the process of FIG. 2, and turning more specifically to FIG. 4, a process 400 is depicted illustrating another process for initiating OTA configuration for a telematics-equipped vehicle in other applications, such as providing software or firmware updates and providing users with an option to download and install additional functionality. For example, in one implementation, a TSP, wireless carrier, or telematics unit may determine that a trigger has occurred 401 based on the development of a new software or firmware version of a program on the telematics unit. In another example, the trigger 401 might be set to an amount of time that has elapsed since the software or firmware on the telematics unit was last updated (e.g. the telematics unit could update to the latest version once a year).

After determination that the trigger or condition has been met, the TSP, wireless carrier, or telematics unit initiates OTA configuration 403 by setting up a connection between the telematics unit and the TSP or between the telematics unit and the wireless carrier over the wireless network, and the telematics unit may receive software or firmware updates over the air. In one implementation, the update may be an optional feature, and the user of the telematics unit may choose to decline or approve 405 the OTA configuration session. If approved, the TSP or the wireless carrier may determine whether the download or update was successful 407. For example, the telematics unit may perform a check or hash function on the received data and transmit it back to the TSP or wireless carrier to check for completion.

When the TSP or wireless carrier has verified that the download or update is complete, the telematics unit may display or play a prompt 409 to the user indicating completion of the OTA. In a further implementation, the OTA configuration session may have simply downloaded an application that needs to be executed or installed, and the telematics unit may display a prompt 409 requesting approval from the user to execute or install the application, or may simply indicate to the user that the application is being executed or installed.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the MSCs may be carried out according to stored instructions or applications installed at the MSCs. It will further be appreciated that communications between the telematics unit and the TSP referred to herein may be carried out through the TSP call center, and communications between the telematics unit and the wireless carrier are carried out through components of the wireless carrier's network.

It will be appreciated that the described system and method allows for provisioning of a telematics unit on a telematics-equipped vehicle with cellular service information without pre-loading the cellular service information during manufacture of the vehicle or telematics unit. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for processing a location update from a telematics unit, the method comprising:
    receiving, at a mobile switching center (MSC), a location update from a telematics unit of a telematics-equipped vehicle over a network;
    determining, at the MSC, that cellular service information corresponding to the telematics unit has not yet been programmed into an Home Location Register (HLR) on the network, and, in response, holding the location update; and
    determining that the cellular service information corresponding to the telematics unit is programmed into an HLR on the network, and, in response, initiating an over-the-air (OTA) configuration session with the telematics unit so as to configure the telematics unit for cellular services.

2. The method of claim 1, wherein the cellular service information includes at least one Subscriber Identity Module (SIM, Mobile Subscriber Integrated Services Digital Network Number (MSISDN), Local Access Number, and International Mobile Subscriber Identity (IMSI).

3. The method of claim 1, wherein the OTA configuration session further comprises: provisioning the telematics unit with at least one of a Subscriber Identity Module (SIM), Mobile Subscriber Integrated Services Digital Network Number (MSISDN), Local Access Number, and International Mobile Subscriber Identity (IMSI).

4. The method of claim 1, further comprising:
    determining, at the MSC, whether the OTA configuration session is complete.

5. The method of claim 1, wherein the OTA configuration session further comprises:
    sending, to the telematics unit, data corresponding to at least one of a software update and a firmware update.

6. The method of claim 1, wherein the network is a 2G Global System for Mobile Communications/3G Wideband Code Division Multiple Access (2G GSM/3G WCDMA) network.

7. A method for processing location updates by a telematics unit, the method comprising:
    sending, to the telematics unit from a call center, an instruction not to send location updates until cellular service information corresponding to the telematics unit is programmed into an Home Location Register (HLR) on the network; and
    determining, by the call center, that the cellular service information corresponding to the telematics unit is programmed into an HLR on the network, and, in response, initiating, at the call center, an over-the-air (OTA) configuration session with the telematics unit and notifying the telematics unit that cellular service information corresponding to the telematics unit was programmed into an HLR on the network.

8. The method of claim 7, wherein after the OTA configuration session has occurred, the method further comprises:
    sending a further instruction to the telematics unit to not send location updates until the occurrence of a predetermined condition, wherein the predetermined condition is at least one of the following: a predetermined amount of time has elapsed; receiving an input at the telematics unit indicating that location updates should he sent; and detection of an emergency situation.

9. The method of claim 7, wherein the OTA configuration session comprises:
    provisioning the telematics unit with at least one of a Subscriber Identity Module (SIM), Mobile Subscriber Integrated Services Digital Network Number (MSISDN), Local Access Number, and International Mobile Subscriber Identity (IMSI).

10. The method of claim 9, wherein the OTA configuration session further comprises:
    sending, to the telematics unit, data corresponding to at least one of a software update and a firmware update.

11. The method of claim 7, further comprising:
    determining, at the call center, whether the OTA configuration session is complete.

12. A tangible, non-transient computer-readable medium, part of a telematics unit on a telematics-equipped vehicle, having thereon computer executable instructions for sending location updates over a network, the computer executable instructions comprising instructions for:
    sending a location update over a network based on whether cellular service information corresponding to the telematics unit has been programmed into an Home Location Register (HLR) on the network; and
    determining that the cellular service information corresponding to the telematics unit is programmed into an HLR on the network, and, in response, connecting to at least one of a call center and a wireless carrier over the network to conduct an over-the-air (OTA) configuration session.

13. The computer-readable medium of claim 12, wherein the computer executable instructions further comprise instructions for:
    receiving and storing at least one of a Subscriber Identity Module(SIM), Mobile Subscriber Integrated Services Digital Network Number (MSISDN), Local Access Number, and International Mobile Subscriber Identity (IMSI).

14. The computer-readable medium of claim 12, wherein the computer executable instructions further comprise instructions for:
    receiving at least one of a software update and a firmware update; and
    executing the received update.

15. The computer-readable medium of claim 12, wherein the computer executable instructions further comprise instructions for:

determining whether the OTA configuration session is complete.

* * * * *